UNITED STATES PATENT OFFICE.

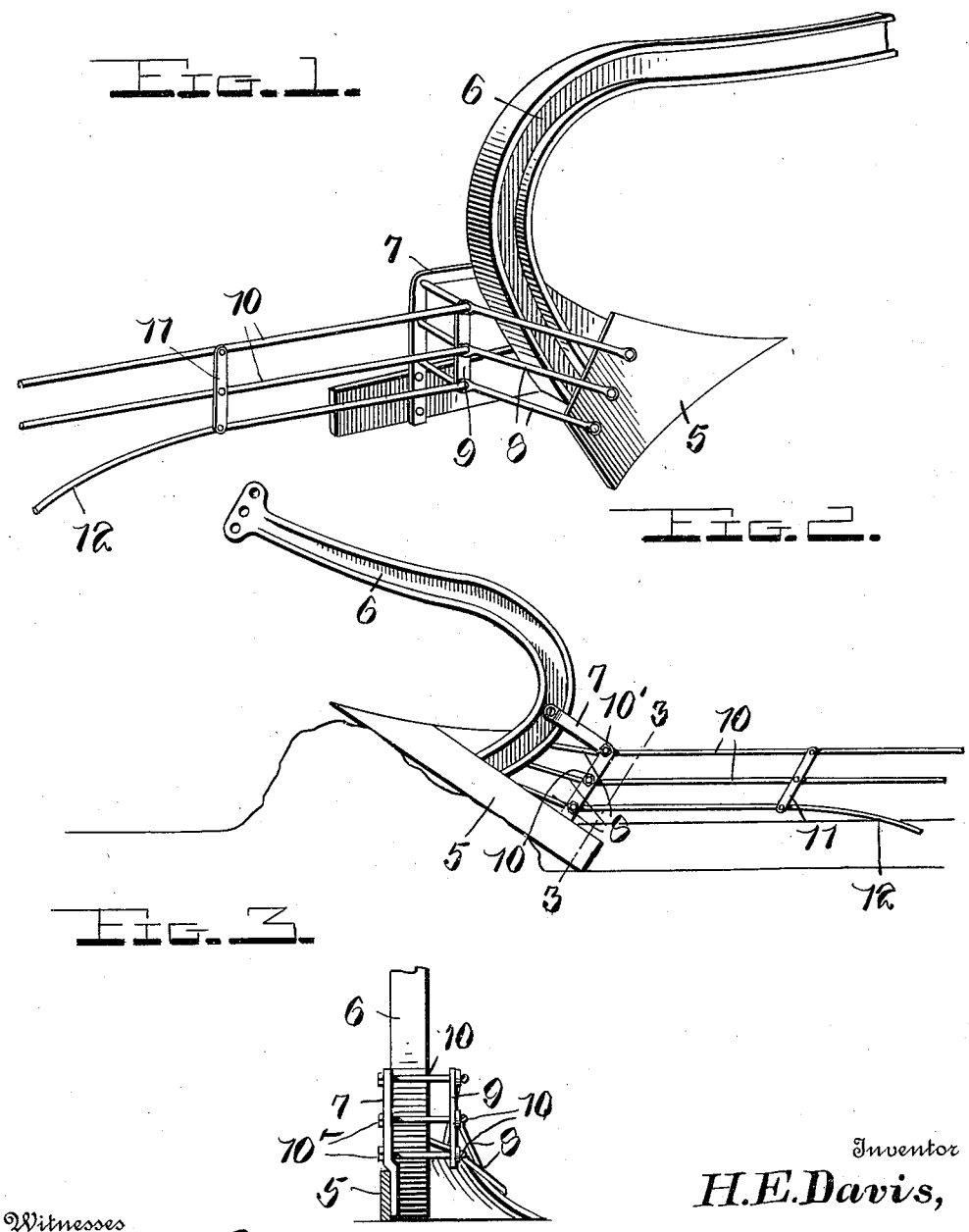

HENRY E. DAVIS, OF THREE HILLS, ALBERTA, CANADA.

PLOW ATTACHMENT.

979,829.  Specification of Letters Patent.  Patented Dec. 27, 1910.

Application filed July 18, 1910. Serial No. 572,549.

*To all whom it may concern:*

Be it known that I, HENRY E. DAVIS, a citizen of the Dominion of Canada, residing at Three Hills, in the Province of Alberta, Dominion of Canada, have invented certain new and useful Improvements in Plow Attachments, of which the following is a specification, reference being had to the accompanying drawings.

This invention relates to improvements in plows and more particularly to a plow attachment which is so arranged with relation to the plow that the plow point may be moved to any angle with relation to the ground surface without disturbing the ridge of earth turned from the furrow by the plow point.

Another object is to provide a guard device pivotally mounted upon the plow and extending rearwardly thereof, said device being arranged in parallel relation with the furrow to support the earth which is turned therefrom by the plow point to obviate the liability of the same being thrown back into the furrow when the plow point is lifted to avoid an obstruction or is disposed out of a straight line by the unevenness of the ground surface.

A still further object of my invention is to provide a plurality of rearwardly extending parallel guard rods loosely connected together adjacent to their extremities for relative movement, and means for rotatably mounting the rods upon the plow whereby they maintain their parallel relation with the ground surface in the vertical movement of the plow point.

With the above and other objects in view, the invention consists of the novel features of construction and the combination and arrangement of parts hereinafter fully described and claimed and illustrated in the accompanying drawings in which—

Figure 1 is a perspective view of a plow showing the attachment arranged thereon in operative position. Fig. 2 is a side elevation, showing the position of the parts when the plow point is raised, and Fig. 3 is a section taken on the line 3—3 of Fig. 2.

Referring more particularly to the drawings, 5 indicates the landside, and 6 the plow beam. This plow may be of any ordinary construction and comprises no part of the present invention.

The device which is embodied in this application might be properly defined as a movable extension mold board as it is devised for accomplishing substantially the same purpose as the mold board of plows of the usual construction. It however, differs essentially from such mold boards, in that it is not rigidly secured to the plow share but is rotatably supported thereon and extends rearwardly from the same, so that it will maintain its parallel relation with the furrow, irrespective of the variations of ground elevation, which cause the plow point to move vertically in the furrow. It is due to this vertical tilting movement of the plow point that the present arrangement of the mold board is ineffective in such circumstances, as it does not prevent the earth which has been turned by the plow point from falling back into the furrow. My improved attachment does effectively accomplish this purpose and embodies in its construction the following elements: To one side of the rear end of the plow beam and to the landside, the right angular bar 7 is secured. A plurality of rigid supporting rods 8 are secured to the plow share adjacent to its forward end and have secured to their rear ends the vertical bar 9 which is disposed in spaced parallel relation to the vertical arm of the bar 7. The guard rods 10 are of L-shaped form, as clearly shown in Fig. 1, and have their short angular end portions loosely mounted to rotate in openings formed in the bars 7 and 9. Nuts 10' are threaded upon the extremities of the short angular portions of the rod and prevent their movement through the openings in said bars. The longer portions of the rods 10 extend in spaced parallel relation rearwardly of the plow shaft and adjacent to their rear ends are loosely connected together and held in spaced parallel relation by means of the link 11. This link permits of a certain amount of relative longitudinal movement of the rods 10, and serves to greatly strengthen the construction of the guard. The lowermost rod 10 has its rear end portion curved downwardly as shown at 12 and is adapted to engage in the furrow which has been formed by the plow point. This trailing end of the rod positions the guard attachment properly, so that the rods 10 are disposed and moved upon one side of the ridge of earth turned by the plow, said rods extending substantially the entire height of the earth ridge and effectively preventing its return to the furrow which might be caused by the deflection of the plow point in the manner above set forth.

The manner in which my improved attachment is adapted to operate is very clearly illustrated in Fig. 2 of the drawing, wherein it will be noted that the plow point has struck a slight elevation in the ground surface such as a compact mass of roots or a tuft of grass, through which the point can not penetrate. The plow point is therefore lifted and raised above the ground surface. The guard rods however, are not disturbed, as they will rotate in the bars 8 and 9, and still maintain their parallel positions with relation to the ground so that the earth ridge will be supported as far as it has been turned up by the plow, and its return to the furrow thus avoided.

From the foregoing it is believed that the construction and operation of my improved plow attachment will be readily understood. The device is simple and may be produced at a comparatively low cost. No alterations in the construction of the ordinary plow are required in order to use my attachment. It has been found extremely effective in practical use, and especially in plowing new ground which has recently been cleared of tree stumps. Instead of curving the rear end of the lowermost guard bar, as above described, if desired a supporting wheel may be mounted on the end of this bar. This however, is such a common expedient that it is not necessary to illustrate the same in the drawing. It will also be understood that the device is susceptible to a great many other minor modifications, in regard to the form, proportion and arrangement of the various elements without departing from the esential features or sacrificing any of the advantages of the invention.

I claim:

1. A plow attachment comprising a plurality of spaced parallel rods pivotally mounted upon the mold board and extending rearwardly thereof, means pivotally connecting said rods intermediate of their ends to maintain the same in parallel relation, the end of the lowermost rod being bent downwardly to engage the ground surface and support said rods at all times in parallel relation thereto.

2. A plow attachment comprising a plurality of spaced parallel rods pivotally mounted upon the mold board and extending rearwardly thereof, the rearwardly extending portions of said rods being freely movable independently of the plow and disposed in parallel relation to the ground surface at all times, and a movable member pivoted to each of the rods intermediate of their ends to movably connect the same.

3. A plow attachment comprising a plurality of spaced parallel rods bent at right angles at one of their ends and pivotally mounted upon the mold board, said rods extending rearwardly of the plow and being independently movable thereof, the end of the lowermost rod being bent downwardly and engaged in the furrow made by the plow to support said rods in parallel relation to the ground at all times, and a link pivotally connecting said rods intermediate of their ends to support the same in spaced relation.

4. In an attachment of the character described, the combination with a plow, of spaced supporting bars secured to the plow, a plurality of substantially L-shaped rods rotatably mounted in said bars and extending rearwardly thereof, said rods being disposed in spaced parallel relation and in the same vertical plane, and a link connecting said rods adjacent to their rear ends to movably support the same.

5. In a plow attachment the combination with a plow, of spaced vertical bars carried by said plow, a plurality of L-shaped rods having their shorter arms rotatably mounted in the bars, the longer arms of said rods extending rearwardly thereof in spaced parallel relation, means for supporting said rods above the ground surface, and a link connecting said rods to movably support the same.

6. In a plow attachment, the combination with a plow, of spaced parallel supporting bars carried by the plow, a plurality of rods rotatably mounted in said bars and extending rearwardly thereof in spaced parallel relation with the ground surface, one of said rods being bent at its rear end to engage in the furrow left by the plow and support the rods above the ground surface, and a link loosely connecting said rods adjacent their rear ends to maintain the same in spaced relation.

In testimony whereof I hereunto affix my signature in the presence of two witnesses.

HENRY E. DAVIS.

Witnesses:
 CATHERINE C. M. SHAW,
 HUGO F. SHAW.